United States Patent [19]
De Courcy

[11] 3,814,233
[45] June 4, 1974

[54] CONVEYORS

[75] Inventor: Rowland J. J. De Courcy, Basingstoke, England

[73] Assignee: Douglas-Rownson Limited, Basingstoke, England

[22] Filed: Nov. 30, 1972

[21] Appl. No.: 310,897

[30] Foreign Application Priority Data
Dec. 6, 1971  Great Britain.................... 56544/71

[52] U.S. Cl............................................. 198/127 R
[51] Int. Cl............................................. B65g 13/02
[58] Field of Search........................... 198/127, 203

[56] References Cited
UNITED STATES PATENTS
3,502,197  3/1970  Takeo-Kato .................... 198/127 R Primary Examiner—Richard E. Aegerter
Attorney, Agent, or Firm—Brisebois & Kruger

[57] ABSTRACT

A roller conveyor of the kind in which rollers are free to turn between side members and are driven by means of an endless driving belt or the like which engages the undersides of the rollers is so constructed that at least one group of rollers together with the supporting side members form a unit mounted for movement in a generally horizontal plane in a direction opposite to the direction of conveying against a resilient biasing force, movement in this direction in excess of a predetermined amount serving to actuate a control member to operate an independently powered mechanism for separating the rollers of the unit from the driving belt or the like so that the frictional drag is completely removed. The independently powered mechanism preferably lifts the unit as a whole to separate the rollers from the driving belt and may be pneumatically operated, the control member controlling the flow of compressed air to the mechanism.

8 Claims, 4 Drawing Figures

CONVEYORS

This invention relates to so-called "live" roller conveyors of the kind in which the conveying rollers are free to turn between side members and are driven by means of an endless driving belt or the like which engages the underside of the rollers. In the event of stoppage, for example if there is a delay in removing the articles from the conveyor, or a deliberate stoppage for the purpose of batching or accumulating a number of articles, considerable frictional forces will be generated both between the engaging surfaces of the driving belt and rollers and between the rollers and the underside of the articles being conveyed thus leading to an undesirable crushing force on the articles being conveyed and also overloading of the drive and undue wear and tear to the conveyor as a whole.

The driving belt itself moves in the opposite direction to the articles being conveyed since it engages the underside of the conveying rollers and consequently when an article is arrested, the reaction between the belt and each conveying roller tends to move the roller in the direction of the belt, i.e., rearwardly in respect to the conveying direction. In some previous constructions of such conveyors, this rearward reaction has been used to relieve the pressure between each roller and the driving belt, thus reducing the frictional forces involved. The reduction can, of course, be only partial since the effect relies on the rearward reaction and if the pressure between the driving belt and the roller were to be relieved completely the reaction itself would then cease.

According to the present invention at least one group of rollers together with the supporting side members are constructed as a unit mounted for movement in a generally horizontal plane in a direction opposite to the direction of conveying against a resilient biasing force, movement in this direction in excess of a predetermined amount serving to actuate a control member to operate an independently powered mechanism for separating the rollers of the unit from the driving belt or the like. The rollers then remain separated from the driving belt until the power operating the separating mechanism is subsequently switched off. Since the force necessary for the separation of the rollers from the driving belt is obtained quite independently of the reaction derived from the driving belt, it is possible to make the separation complete so that the frictional drag is completely removed and the rollers thus act as so-called "gravity" rollers which are free to turn with very little frictional resistance.

The group of rollers may include, for example, approximately 24 rollers which are mounted between common side members to move as a unit. The rollers of the unit rest on the driving belt which, in its turn, may conveniently be supported by idler rollers lying directly beneath corresponding conveying rollers so that these latter rollers indirectly support the conveying rollers. Particularly with such an arrangement, the separation of the conveying rollers from the driving belt is preferably achieved by arranging the independently powered mechanism to lift the unit as a whole to separate the conveying rollers from the driving belt. This removes the drive from the conveying rollers and, under these circumstances the weight of the unit is taken by the independently powered mechanism.

The independently powered mechanism is conveniently operated pneumatically and the control member then controls the flow of compressed air to the mechanism. The mechanism most simply comprises inflatable members mounted towards the two ends of the unit and, in practice, a single elongated inflatable member towards each end of the unit is found to be adequate. Other forms of lifting mechanism may, of course, be used and, in particular, the inflatable members may be replaced by pneumatically operated jacks, of which one is then required at each corner of the unit. The resilient biasing force applied to the unit may conveniently be provided by a coil spring and when the operation is pneumatic the control member may comprise a valve operated by a limit switch when horizontal movement of the unit exceeds the predetermined amount.

A number of successive units, each comprising a group of conveying rollers, may be controlled in the manner just described so as to constitute a sectional accumulating conveyor which permits the nose-to-tail accumulation of articles irrespective of the length of the different articles and which enables these articles to be formed into a batch of any required length. When operating for accumulating or batching purposes, a stop member is required for arresting articles on the conveyor and a main valve controlled by this stop member may supply compressed air to the pneumatically operated mechanisms when the stop member is operated.

As each successive article is stopped by the stop member, the frictional drag exerted on the rollers of a unit by the driving belt becomes progressively greater until it is sufficient to move the unit in a rearward direction against the effect of its biasing spring and thus to operate the limit switch and allow compressed air to lift the unit clear of the driving belt. In general this may be arranged to occur when something less than one-half of the total length of the unit has been occupied by articles so that the remaining articles fed on to the associated group of rollers pass freely over the rollers which then act purely as gravity rollers without any substantial drag. When the accumulated articles reach back as far as the next unit, the process just described is repeated and when sufficient articles have accumulated on this next unit, causing it to move rearwardly against the effect of its spring, this unit is then lifted in its turn.

This occurs for each successive group unit until sufficient articles have accumulated to form the required length of batch. Release of the stop member then cuts off the supply of compressed air to all the lifting mechanisms simultaneously (or in the more general case, removes the power from the mechanisms separating each unit from the driving belt) so that the drive is resumed on all the units substantially simultaneously and the articles then move off together as a single batch. To avoid any slight delay in restarting the drive, the main valve controlled by the stop member preferably has an alternative position to which it is moved by movement of the stop member to its inoperative position, the alternative position of the valve supplying compressed air to all the pneumatically operated mechanisms in parallel so as to return the rollers of each unit into contact with the driving belt in a positive manner. The drive is thus resumed on all the groups of rollers substantially simultaneously and the articles on the conveyor then move off together as a single batch.

Previous constructions of accumulating conveyors have included groups of rollers from which the drive has been removed in succession, but these have involved the inclusion of mechanical linkages or sensing mechanisms which have operated continuously during normal conveying. With a construction in accordance with the invention, the conveyor acts as a normal conveyor of the live roller type, that is to say without the operation of any mechanical linkage or sensing mechanism. It is only when a stoppage occurs, i.e., specifically when a stop member is brought into position to arrest the articles, that the mechanism for interrupting the drive is brought into action so as to separate each successive group of rollers from the driving belt. Moreover, when the drive is restarted, all the articles move off together as previously described instead of moving off one at a time with a space between adjacent articles as has been the case with previous constructions.

Apparatus in accordance with the invention will now be described in more detail, by way of example, with reference to the accompanying drawings, in which.

Figure 1:
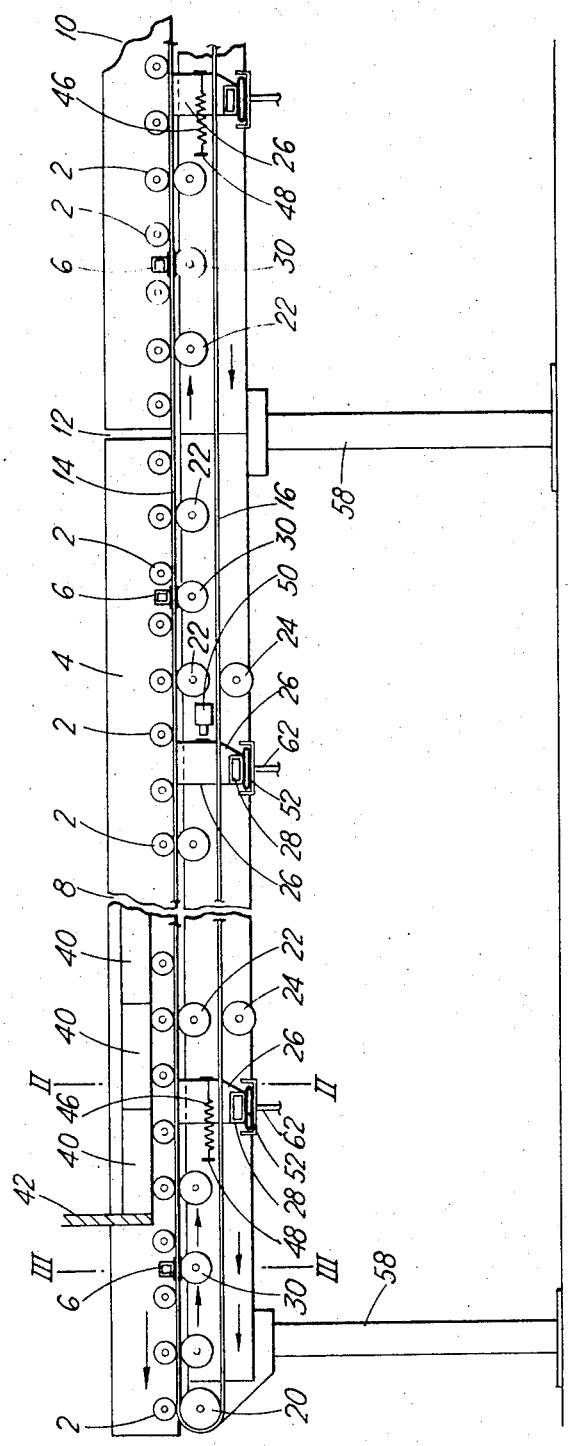
FIG. 1 is a side elevation of the apparatus with parts broken away.

Turning first to FIG. 1, the conveyor illustrated comprises a series of conveying rollers 2 which are free to turn in side members 4 which are interconnected by cross members 6 to constitute individual units comprising groups of conveying rollers. Since the conveyor may extend for a considerable length, it is shown broken away at 8 and at the right hand end at 10 and a gap between adjacent units comprising side members 4 cross-members 6 and a group of rollers 2 is shown at 12. The rollers 2 are driven in an anti-clockwise direction so as to convey articles from right to left as seen in FIG. 1 by engagement with an endless driving belt 14. The upper run of this belt moves from left to right so as to produce the required anti-clockwise rotation of the rollers 2 and the lower run, shown as 16 naturally moves in the opposite direction, i.e., from right to left, being supported at intervals by idler rollers 24. At the left hand end of the conveyor, the belt passes around an end pulley 20 and the drive to the belt is towards the right hand in the portion not shown. The upper run of the belt 14 is supported at intervals by idler rollers 22 each of which lies directly below a corresponding conveyor roller 2 so that the belt is nipped between these pairs of rollers, thus providing an effective drive to the conveying rollers 2.

Figure 2:
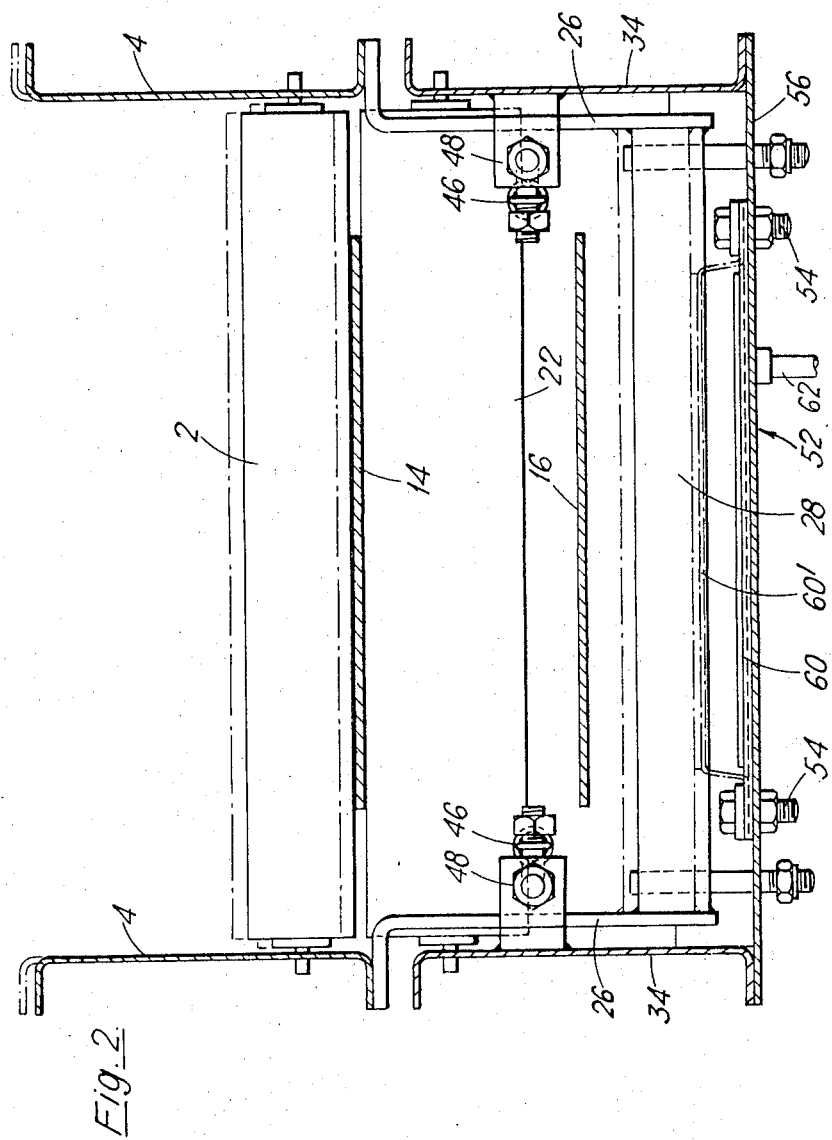
FIG. 2 is a transverse sectional view to an enlarged scale along the line II—II in FIG. 1.
Figure 3:
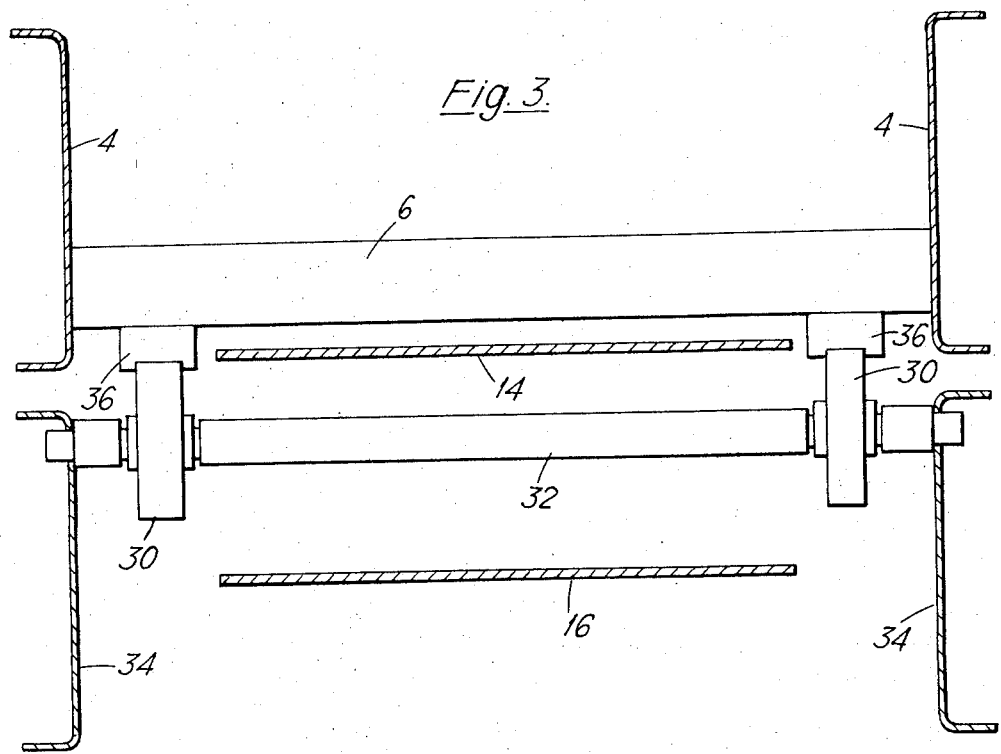
FIG. 3 is a sectional view similar to FIG. 2 but taken on the line III—III in FIG. 1.

The arrangement is shown in more detail in FIGS. 2 and 3 and it will be seen that the side members 4 of each unit are connected to downwardly extending brackets 26 which are cross-connected at their lower ends by members 28. Although FIG. 1 does not show the complete length of any one unit, brackets 26 are provided towards each end of each unit and three such brackets are seen in FIG. 1. The weight of each unit including side members 4, cross members 6 and rollers 2 is partly supported by the rollers 22 through the upper run of the driving belt 14 and partly by freely rotatable wheels 30 mounted on spindles 32 between side members 34 forming part of the stationary frame of the conveyor as seen in FIG. 3. The wheels 30 engage grooves in plates 36 secured to the cross members 6 of the roller units. Owing to the support by the wheels 30 each roller unit can move freely in a longitudinal direction over a limited range, but the engagement between the wheels 30 and the grooves in the plates 36 restricts any lateral movement.

Articles being conveyed by the conveyor are shown diagrammatically in FIG. 1 as 40 and a stop member is indicated in section as 42. If arrested by the member 42 or if there is any other form of blockage which prevents movement of the articles 40 to the left, the rollers 2 beneath these articles are prevented from rotating and as a consequence, the movement of the upper run 14 of the driving belt to the right produces a reaction towards the right on the rollers in question. This reaction is transmitted to the unit as a whole which, as just described, is capable of limited movement in a longitudinal direction. This movement to the right is resisted by a pair of coil springs 46, seen diagrammatically in FIG. 1 and the ends of which are seen in FIG. 2. At one end each spring 46 is connected to a respective bracket 26 and at the other end it is connected to a lug 48 projecting inwardly from the respective side members 34 of the stationary frame.

If the stoppage of the articles 40 is only partial, a relatively small force towards the right may be exerted which will extend the springs 46 to only a relatively small extent and no further action will occur. In the event of a complete stoppage, however, e.g., by means of the stop member 42, the springs 46 are extended so as to permit movement of the respective unit to the right until a limit switch shown as 50 in FIG. 1 is operated. The switch 50 controls a pneumatic circuit which supplies compressed air to a pair of pneumatic lifting devices in the form of inflatable members 52. Each inflatable member 52 is of flattened tubular configuration and is closed at its ends, where it is secured by means of bolts 54 to a plate 56 extending between the side members 34 of the stationary frame. The stationary frame is itself supported at intervals by pillars 58 arranged at intervals and supporting the conveyor as a whole at the required height. Except when inflated, the pneumatic lifting devices 52 are quite flat as shown by the full line 60 in FIG. 2. Air is supplied to the interior of the device by way of a connection 62 and when inflated, each device is distended to the dotted line position shown as 60'. This causes the device to engage the lower side of the cross member 28, thereby lifting the unit as a whole by way of the brackets 26 attached to the side members 4. The lifting devices extend for a greater part of the width of each unit and since there is one device towards each end of the unit, the devices between them lift the unit as a whole in a generally horizontal position, thus lifting the conveying rollers 2 and separating them from the upper run of the driving belt 14, thus removing the drive. This avoids overloading the drive to the belt and also avoids undue wear and tear to the conveyor as a whole. It will be understood that the lifting of the units is solely by the devices 52 and that these are powered by means of compressed air which is completely independent of the reaction derived from the driving belt. Consequently the separation can be quite complete in that once the reaction from the driving belt has operated the limit switch 50, it performs no further function and the remainder of the lifting is carried out quite independently by the compressed air.

Figure 4:
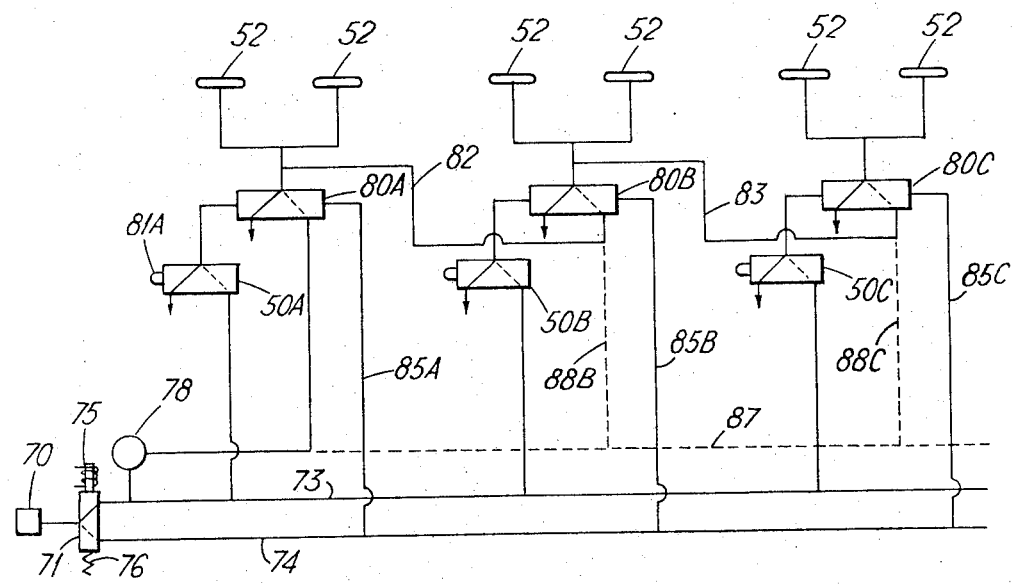
FIG. 4 is a pneumatic circuit diagram.

The operation of the pneumatic circuit controlling the lifting devices 52 will now be described in more detail with reference to FIG. 4 of the drawings. The source of pneumatic pressure is shown as 70 and this supplies the circuit as a whole through a change-over valve 71 operated from the stop member 42. During normal operation and also when the stop member is in its operative position the valve 71 takes up the position shown by the full line to supply a branch 73 while when the stop member 42 is moved to its inoperative position, the valve 71 temporarily moves to the dotted line position to supply a branch 74. The valve 71 is operated by a solenoid indicated diagrammatically as 75 which is normally energised during operation and is moved to the dotted line position by means of a spring 76 when the solenoid 75 is temporarily deenergised. The branch 73 includes a pressure regulator and gauge 78 which supplies reduced pressure to a valve 80A which, in its turn, supplies the air at this reduced pressure to the two lifting devices 52 associated with a particular unit of the conveyor. Air at full pressure is supplied from the branch 73 to the limit switch valve 50A which is the first of these valves in the sequence. When this valve is operated by pressure of the unit against its operating plunger 81A, the valve makes the connection shown in dotted lines to operate the valve 80A which then supplies low pressure air to inflate the lifting devices 52. At the same time, the valve 80A makes a second connection through a line 82 to a similar valve 80B associated with the next unit. This valve 80B is controlled by a limit switch valve 50B, but even if the valve 50B is opened, the valve 80B cannot supply air to the associated pneumatic lifting devices 52 unless the valve 80A has first been operated to supply air by way of the connection 82. Provided the valve 80A has first been operated, however, operation of the limit switch valve 50B will cause the valve 80B to supply air to the associated pneumatic lifting devices 52 and, at the same time, to pass the supply on to a third valve 80C by way of a line 83. By arranging the valves 80A, 80B and 80C in series in this manner, the valve 80B cannot operate its associated lifting devices 52 until the valve 80A has been operated and the valve 80C cannot operate its lifting devices 52 until the valve 80B has been operated. In other words, the successive units can only be lifted in the correct sequence and if, by any chance, a unit were to be moved horizontally by some extraneous cause, this would not bring about the operation of the lifting devices 52 if the previous units in the sequence had not already been lifted.

The branch 74 of the pneumatic circuit is provided in order to ensure rapid and substantially simultaneous lowering of all the units of the conveyor by deflation of the lifting devices 52 when the stop member 42 is moved to its inoperative position. As already described, movement of the stop member to this position causes the valve 71 to move temporarily to the dotted line position to supply full pressure to the branch 74 and thence via connections 85A, 85B, 85C and so forth to the respective valves 80A, 80B and 80C. The application of this pressure switches each valve over to make the full line connection to exhaust indicated by the arrow. Accordingly, as soon as the stop member is moved to its inoperative position, all the valves 80A, 80B and 80C are moved substantially simultaneously to deflate the lifting devices 52 and thus to cause the articles on the different units to move forward substantially simultaneously.

As already explained, the purpose of connecting the valves 80A, 80B and 80C in series is to ensure that these valves can only be operated in the correct sequence. Such precautions are not always necessary, however, e.g., if the conveyor is working in a tunnel or in a raised position where access by extraneous objects is impossible. Under these circumstances the complication of series connections can be avoided and all the valves 80A, 80B and 80C can be connected in parallel to the supply. For this purpose, an additional branch shown in dotted lines as 87 is connected to the pressure regulator 78 and the valves 80B and 80C are connected directly to this branch by connections shown in dotted lines as 88B and 88C which thus take the place of the full line connections 82 and 83. Consequently, as soon as either the valve 80B or 80C is operated by its respective limit switch valve 50B or 50C, air for inflation purposes is supplied directly from the branch 87 by way of the connection 88B or 88C.

This is particularly convenient for reducing the load on the mechanism in the event of a blockage which may occur at any point and thus requires a corresponding unit of the conveyor to be lifted. In order to restore operation, the solenoid 75 is temporarily deenergised by means of a push button switch (not shown) which causes the respective lifting devices to be deflated and the associated units lowered into driving contact with the belt 14.

Whichever form of connection is adopted for the inflation circuit, i.e., series or parallel, the branch 74 which controls the deflation of the devices 52 is connected in parallel to the valves 80A, 80B and 80C as shown in the drawing.

I claim:

1. In a roller conveyor comprising side members, a plurality of rollers mounted to rotate freely between said side members and a support carrying endless driving means which engages the undersides of said rollers, the improvement comprising means mounting at least one group of rollers and their supporting side members for movement as a unit in a generally horizontal plane in a direction opposite to the direction of conveying, resilient biasing means opposing said movement, a control member actuated by movement of said unit against said biasing means in excess of a predetermined amount and an independently powered mechanism actuated by said control member for separating the rollers of said unit from said endless driving means.

2. A roller conveyor according to claim 1 in which said independently powered mechanism operates to lift said unit to separate said rollers from said driving means.

3. A roller conveyor according to claim 1, in which said independently powered mechanism is pneumatically operated and said control member controls the flow of compressed air to said mechanism.

4. A roller conveyor according to claim 3, in which said independently powered mechanism comprises inflatable members mounted towards the two ends of said unit.

5. A roller conveyor according to claim 3, in which said resilient biasing means is a coil spring and said member comprises a valve and a limit switch operating said valve when horizontal movement of said unit exceeds the predetermined amount.

6. A roller conveyor according to claim 1 and including a plurality of successive units each said unit being mounted for horizontal movement and comprising side members and a plurality of rollers supported by said side members and a plurality of mechanisms for separating the rollers of respective units from said endless driving means.

7. A roller conveyor according to claim 6 in which said separating mechanisms are pneumatically operated and said conveyor including a stop member for arresting articles on said conveyor and a main valve for supplying compressed air to said pneumatically operated mechanisms said valve being opened by operation of said stop member.

8. A roller conveyor according to claim 7, in which said main valve has an alternative position, said valve being moved to said alternative position by movement of said stop member to its inoperative position, said conveyor comprising in addition a pneumatic circuit connected to all said pneumatically operated mechanisms in parallel, said pneumatic circuit being supplied with compressed air in said alternative position of said main valve whereby to return the rollers of each said unit into contact with said driving means in a positive manner.

* * * * *